Sept. 30, 1969  H. C. FLINT  3,469,883
SEAT ASSEMBLY

Filed July 20, 1967  3 Sheets-Sheet 1

INVENTOR.
Hyland C. Flint
BY
Barnard, McGlynn & Reising
ATTORNEYS

Sept. 30, 1969     H. C. FLINT     3,469,883
SEAT ASSEMBLY
Filed July 20, 1967     3 Sheets-Sheet 2
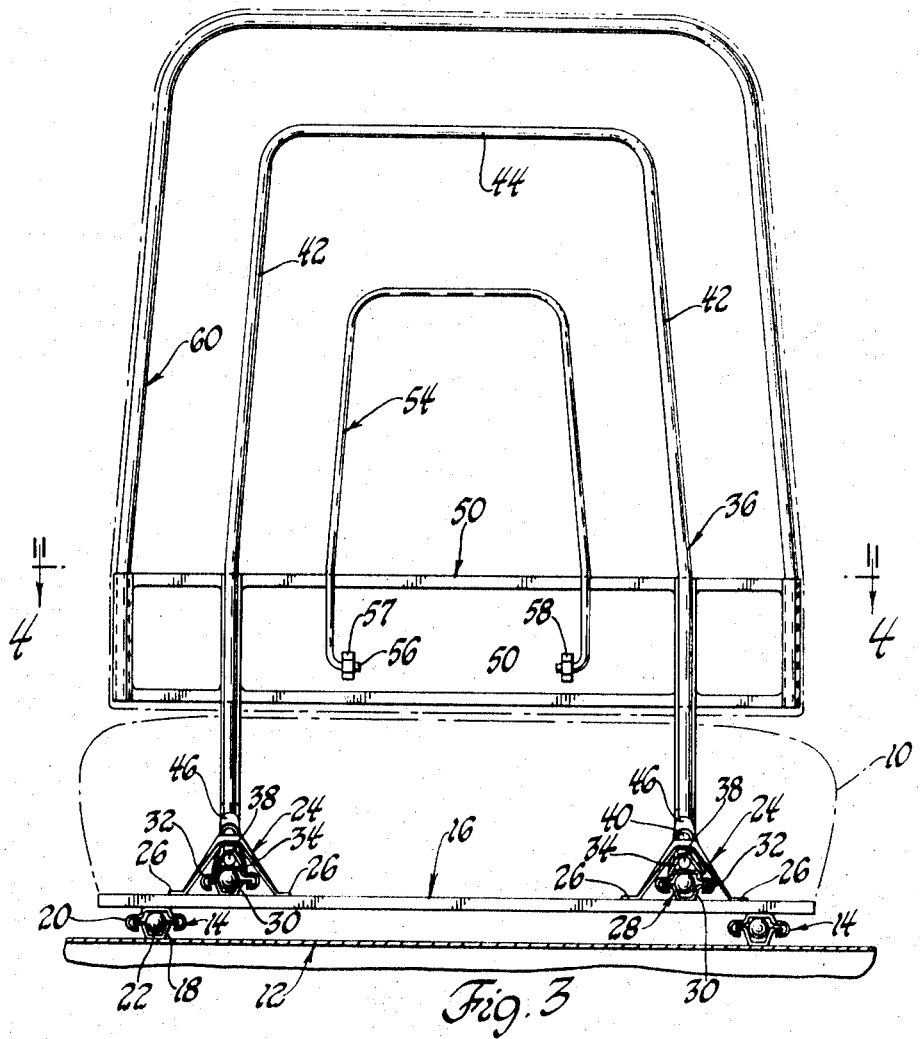
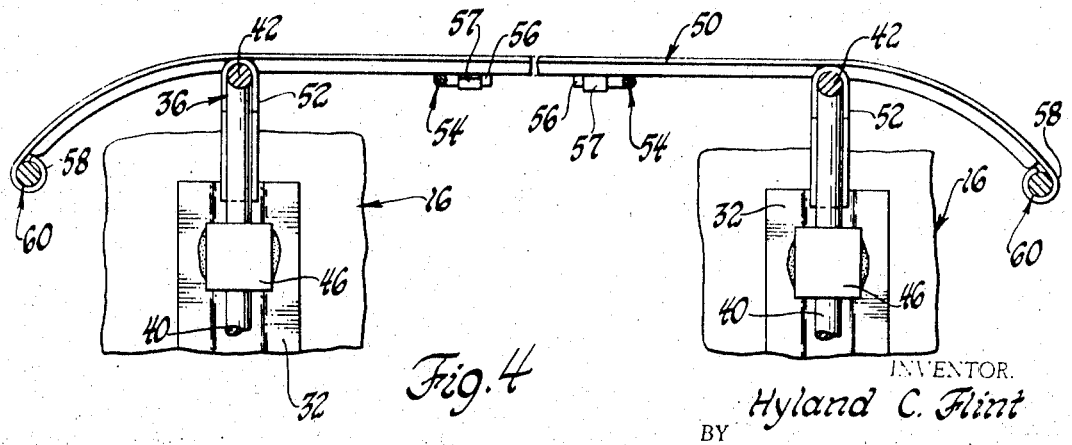
INVENTOR.
Hyland C. Flint
BY
Barnard, McEwynn Leising
ATTORNEYS Sept. 30, 1969   H. C. FLINT   3,469,883
SEAT ASSEMBLY
Filed July 20, 1967   3 Sheets-Sheet 3
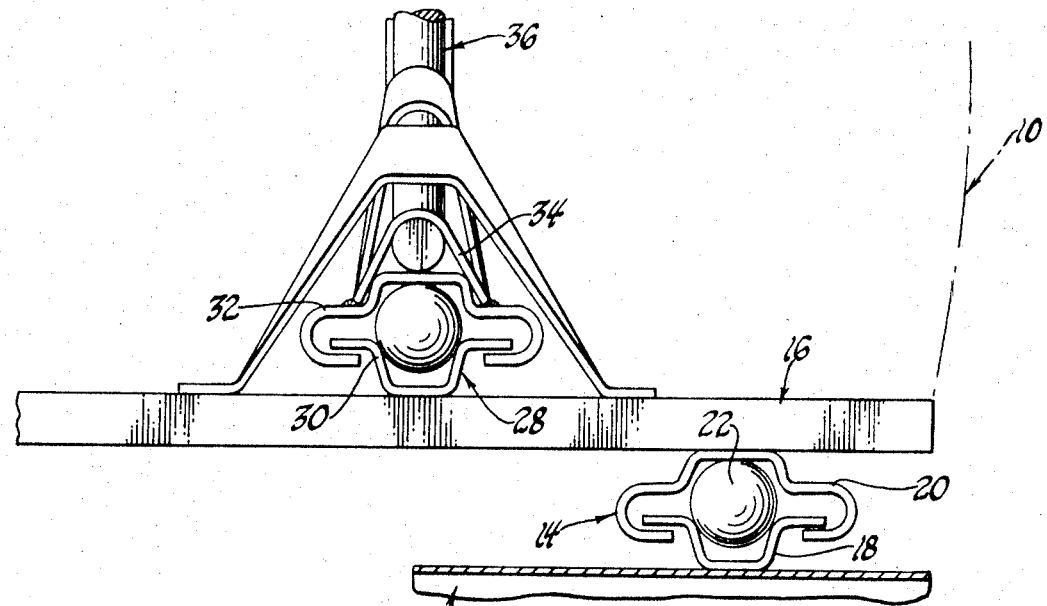
Fig. 5
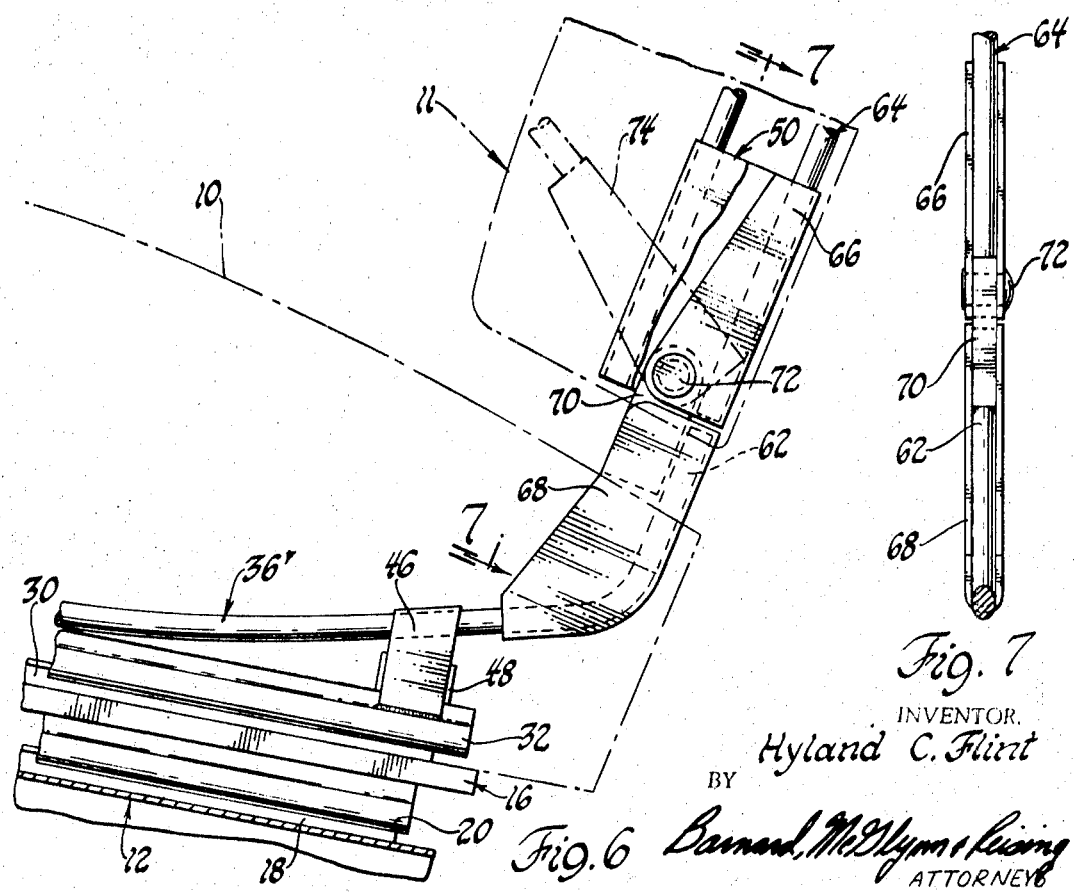
Fig. 6
Fig. 7
INVENTOR.
Hyland C. Flint
BY
Barnard, McGlynn & Reising
ATTORNEYS

United States Patent Office 3,469,883
Patented Sept. 30, 1969

3,469,883
SEAT ASSEMBLY
Hyland C. Flint, 3551 Walnut Lake Road,
Orchard Lake, Mich. 48033
Filed July 20, 1967, Ser. No. 654,772
Int. Cl. B60n 1/06
U.S. Cl. 297—353                                23 Claims

ABSTRACT OF THE DISCLOSURE

An energy absorbing seat assembly in which a backrest is provided with support spring wire members extending downwardly and forwardly to engage a track assembly. The track assembly connects the support members to a base and permits the backrest to be moved forwardly and rearwardly relative to the base and a seat cushion to vary the distance between the front edge of the seat and the front surface of the backrest.

---

This invention relates to seat assemblies, and more particularly to a seat assembly having a backrest portion movably mounted for fore and aft movement relative to the seat portion.

In the design, manufacture and development of seating assemblies, whether in the form of furniture or transportation usage, there is seldom any special provision given to the variation in proportions of occupants who might use such seat assemblies. It is normally the practice to design seats in accordance with the proportions of an average individual, so that an occupant who is differently proportioned from the average is discomforted in using the seat. In other words, the location of a backrest assembly relative to the forward edge of the seat cushion may be suitable for the average occupant, but one who has longer or shorter legs than average finds discomfort in using the seat. Such discomfort leads to numerous aches and pains that would not occur if the individual were sitting on a seat of proper proportions.

In the past, it has been impractical to design seat structures for other than the average occupant. Seat structures are usually manufactured on a production basis, and it would be difficult for manufacturers to have to produce and stock seat assemblies of differing proportions. Similarly, the concept of a movable seat or movable backrest assembly has been impractical because, with the complicated and cumbersome seat structures presently employed, complicated designs for moving parts and the like would be necessary in order to accomplish the purpose.

The device in which this invention is embodied comprises, generally, a seat assembly in which a seat cushion is mounted on a base or platform, such base or platform movably mounting the support elements of a backrest assembly. Such support elements are movably mounted on the base or platform for forward and rearward movement relative to the seat cushion, and since the support elements may be simply designed, they may be enclosed within the seat cushion structure. The support elements extend rearwardly and upwardly to a backrest assembly, mounted above and behind the seat cushion. The entire backrest assembly is thus movable forwardly and rearwardly to change the position of the backrest relative to the forward edge of the seat cushion. As a result, the bodily proportions of the occupant may be accommodated with ease and simplicity, for more comfortable, universal seating.

Such a device is extremely versatile in adjusting for variously proportioned individuals, permitting selective movement of the backrest assembly relative to the seat cushion and thus being usable by a number of differently proportioned individuals in quick succession. The construction is extremely simple and economical, both to manufacture and to assemble. In addition, the backrest assembly may be formed to be energy absorbing in both the horizontal and vertical directions, thus making the overall seat construction readily adaptable to transportation-type seating, such as in automobiles, planes, buses and the like.

These and other advantages will become more apparent from the following description and drawings in which:

FIGURE 3 is a front elevational view of a portion of the structure illustrated in FIGURE 1, taken substantially along the line 3—3 of FIGURE 1 and looking in the direction of the arrows.

FIGURE 4 is a cross-sectional view of the seat structure illustrated in FIGURE 1 through 3, taken substantially along the line 4—4 of FIGURE 3 and looking in the direction of the arrows.

FIGURE 5 is an enlarged front elevational view of a portion of the seat structure illustrated in FIGURES 1 through 4 illustrating the position of the movable parts.

FIGURE 6 is an enlarged elevational view with parts broken away and in section showing a modification of the seat structure illustrated in FIGURES 1 through 5.

FIGURE 7 is an enlarged front elevational view of a portion of the structure illustrated in FIGURE 6 taken substantially along the line 7—7 of FIGURE 6 and looking in the direction of the arrows.

Figure 1:
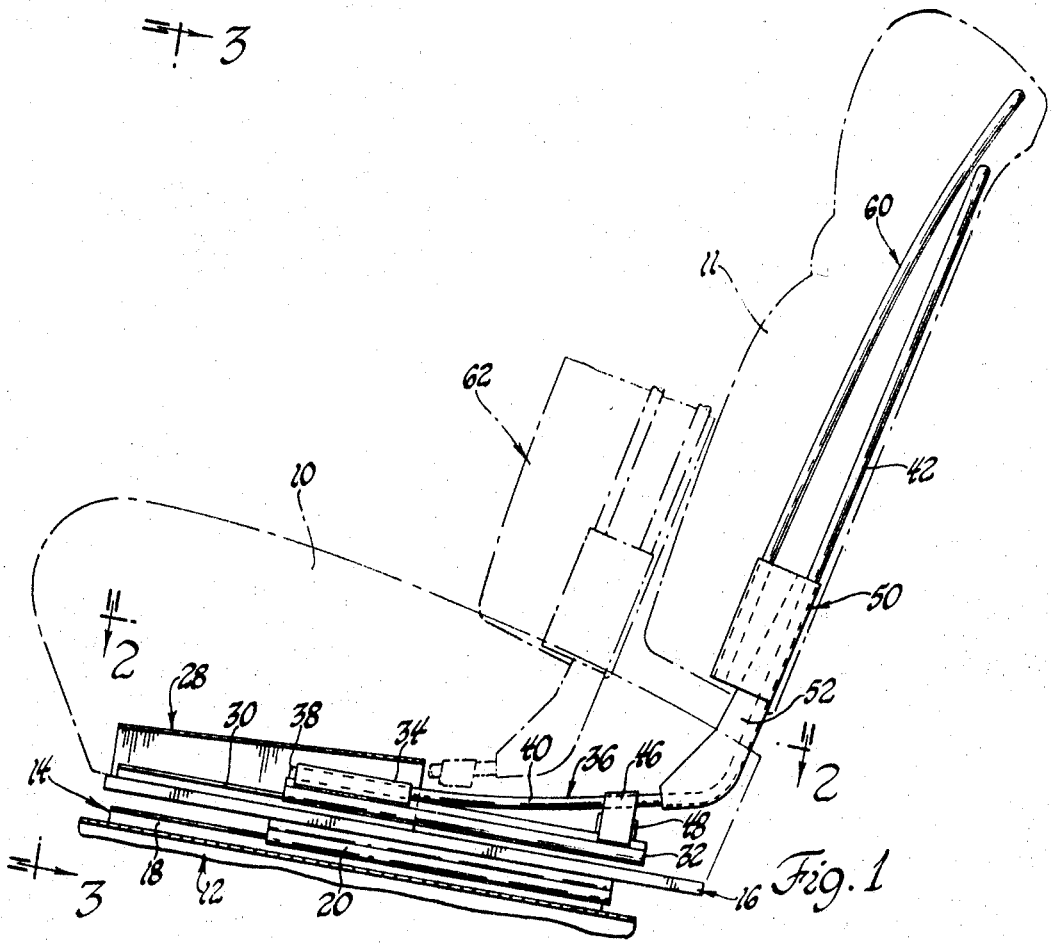
FIGURE 1 is an elevational view, with parts broken away and in section, illustrating an embodiment of the invention and showing the position of the various parts.
Figure 2:
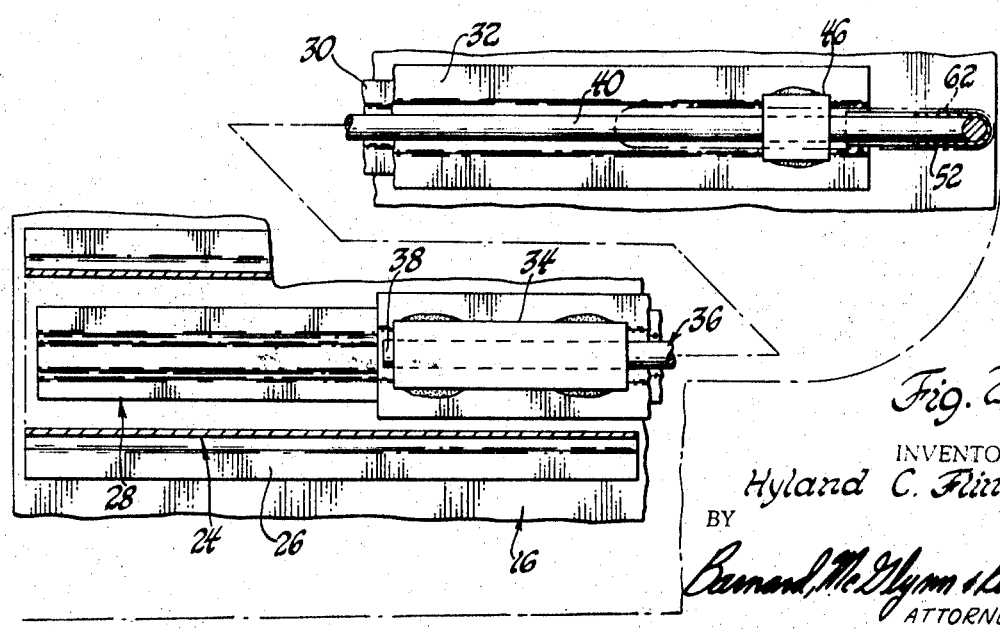
FIGURE 2 is a partial cross-sectional view of the seat structure illustrated in FIGURE 1, taken substantially along the line 2—2 of FIGURE 1 and looking in the direction of the arrows.

Referring more particularly to the drawings, FIGURE 1 best illustrates the overall seat construction wherein a seat cushion, indicated generally by dashed and dotted lines 10, is mounted to have a backrest assembly, indicated generally by dashed and dotted lines 11, mounted over the rearward portion thereof. The seat assembly may be in the form of household furniture, or of the type used in the transportation industry, either in automobiles, trucks, buses, planes or the like. The following description, for ease in explanation and understanding, relates to a vehicle-type seat assembly although, as will become hereinafter more apparent, the usage is not so limited.

A fixed support, indicated generally by the numeral 12, which may be a vehicle floor or the like, has mounted thereon a pair of conventional track assemblies indicated generally by the numeral 14, such track assemblies being spaced apart so as to support a platform or base structure, indicated generally by the numeral 16. Track assemblies 14, being of the conventional type, may include a lower track 18 mounted on the support 12, and an upper track 20 mounted on the underside of the base 16. Upper track 20 is formed to engage the lower track member 18 and prevent disengagement therefrom, the two track members 18 and 20 being separated by one or more balls 22 to reduce the friction in the fore and aft movement. Such a construction permits the base 16 to move along the axes of the track assemblies 14 relative to the support 12.

Mounted on the base member 16 is the seat cushion, indicated generally by the dashed and dotted lines 10, which may be of any suitable interior configuration and assembly and, as will be hereinafter apparent, is movable forwardly and rearwardly relative to the support 12 along with the base member 16.

Also mounted on the base member 16 and within the confines of the seat cushion 10 are spaced tunnel members 24 having outwardly directed flanges 26 secured to the base 16 in any suitable manner. Disposed within the tunnel member 24 are second track assemblies, indicated generally by the numeral 28, which may be conventional in nature and of generally the same construction as previously described with respect to track assemblies 14. Track assemblies 28 each have a lower track 30 secured to the platform 16 and an upper track 32 formed to engage the lower track 30. Mounted on upper track 32 is a retainer channel 34 which serves to clamp a backrest support spring wire, indicated generally by the numeral 36, against the upper track member 32.

Spring support wire 36 is movable with the upper track 32 relative to the lower track 30 and thus the base 16. Wire 36 may be formed into generally U-shaped configuration, as best indicated in FIGURE 3, having an end portion 38 secured by the retainer channel 34, upwardly and rearwardly extending portions 40 and upwardly extending leg portions 42 terminating in a cross portion 44.

Adjacent the rearward ends of upper tracks 32 are U-shaped clip members 46, extending up and over the portions 40 of the spring support wire 36. As will become hereinafter more apparent, the spring support wire 36 may move upwardly and downwardly in generally vertical movement, and the upper surface of the U-shaped clip 46 limits the upper vertical movement of the wire portion 40. Disposed within the clip 46, and adjacent the rearward end of the track member 32, is a resilient bumper member 48 which serves to limit the downward vertical movement of the portion 40 of the spring wire 36.

Disposed above the rearward portion of the seat 10 is a cross member, indicated generally by the numeral 50, having secured thereto a pair of spaced U-shaped channel members 52 receiving the upwardly extending portions 42 of the U-shaped spring wire member 36. Legs 42 of the U-shaped spring wire member 36 are secured in any suitable fashion within the channel members 52 so that the cross member 50 is rigidly secured to the support wire 36. Also secured to the cross member 50, and extending upwardly therefrom, is an inner U-shaped spring wire member, indicated generally by the numeral 54, such spring wire member having inturned ends 56 for securement to the cross member by means of suitable clips or the like 57. U-shaped spring wire member 54 is generally co-planar with the upwardly extending portions 42–44 of spring wire member 36, and together they form a support for a backrest cushion, indicated by the dashed and dotted lines 11.

At the outboard ends of the cross member 50 are rolled portions 58 which receive and support the ends of a third U-shaped wire member, indicated generally by the numeral 60. Member 58 extends upwardly and around the U-shaped spring wire member 36 to form a border support wire for the backrest cushion 11 and to permit the backrest cushion to be formed in any suitable shape. As illustrated in FIGURE 4, it will be noted that the cross member 50 is arcuately and forwardly directed outwardly of the spring wire member 36 so as to provide a bucket-type backrest cushion structure.

As has been previously noted, the mounting assembly for the backrest structure is disposed within the confines of the seat cushion, indicated by dashed and dotted lines 10. In order to permit fore and aft movement of the backrest assembly along with the upper track 32 of the track assembly 28 and relative to the platform or base 16, a pair of slots, indicated by dashed and dotted lines 62, may be formed in the rearward portions of the seat cushion 10 and through which the downwardly extending legs 42 of the wire support member 36 are free to move to a limited extent. In such movement, the backrest assembly is moved forwardly relative to the front edge of the seat cushion 10, such as illustrated by dashed and dotted lines 62 in FIGURE 1. Suitable latch means or retaining means (not shown) may be provided in the track assembly 28 in the usual manner so as to fix the location of the backrest assembly relative to the seat cushion in any of a variety of positions.

Since the support for the backrest assembly is in the form of the U-shaped spring wire 36, including the lower forwardly bent portions 40, it will be seen that the backrest may move in a vertical direction along with the back of the user moving with the resiliency of the seat cushion. Thus, if the seat assembly is utilized in a transportation type use, the backrest assembly will be energy absorbing in both the vertical and horizontal directions.

Referring next to FIGURES 6 and 7, a modification of the hereinbefore described seat assembly is shown and wherein the backrest assembly is allowed to pivot forwardly over the seat cushion 10 as is common in automobile type seat structures. The backrest support members, indicated generally by the numeral 36', terminate adjacent the cross member 50 after an upward bend, as illustrated at 62, and a U-shaped spring wire member 64 extends upwardly therefrom to support the backrest cushion 11. A first channel portion 66 is secured to the cross member 50 and receives and is secured to the U-shaped member 64. A second U-shaped channel portion 68 receives the lower portion of the backrest support member 36'. Secured in the portions 68 and extending into the portions 66 is a reversely bent U-shaped clip member 70 having pivot apertures therethrough. The pivot apertures receive a pivot pin 72 which permits the upper channel portions 66, along with the cross member 50 and the remainder of the backrest cushion 11, to pivot forwardly, as indicated by dashed and dotted lines 74, over the seat cushion 10.

In other respects, the modifications illustrated in FIGURES 6 and 7 are the same as previously described with respect to the seat assembly of FIGURES 1 through 5, and like parts bear like reference numerals.

Thus, a seat assembly is provided which permits the backrest assembly to be moved relative to the seat cushion structure, thus accommodating varying proportions of different occupants of the seat assembly. The movement of the backrest assembly relative to the seat cushion is easily accomplished and may be selectively moved for different occupants with ease and convenience. The entire device is relatively simple in the number of parts, manufacture and assembly, resulting in an economical and efficient device for accomplishing the purposes intended.

Numerous changes and modifications will occur to those having skill in the art, after having had reference to the foregoing description and drawings.

The embodiments of the invention in which an exclusive property or privilege is claimed are defined as follows:

1. A seat assembly comprising:
 a base structure;
 a seat member mounted on said base structure;
 a backrest member; and
 means for mounting said backrest member on said base structure independently of said seat member and permitting said backrest member to move forwardly and rearwardly relative to said seat member, said means including a first track member mounted on said base structure, a second track member slidably engaging the first track member, and spring support means connecting the backrest member to the second track member.

2. The seat assembly set forth in claim 1 wherein said mounting means are secured to said base structure within the confines of said seat member.

3. The seat assembly set forth in claim 1 including means mounted on said second track member and engaging said spring support means for limiting the vertical movement of said backrest member relative to said base structure.

4. The seat assembly set forth in claim 1 wherein said backrest member includes a cross member extending across said backrest member and above said seat member, and said spring support means includes downwardly depending spaced support legs secured to said cross member and to said mounting means.

5. The seat assembly set forth in claim 4 wherein said backrest member further includes a plurality of U-shaped spring wire members secured to said cross member and extending upwardly therefrom in generally planar nested fashion.

6. The seat assembly set forth in claim 4 wherein one of said U-shaped spring wire members is an upward continuation of said spaced support legs.

7. The seat assembly set forth in claim 6 wherein said backrest member further includes a generally U-shaped border wire member secured to said cross member and extending upwardly therefrom and outside said spring wire members.

8. The seat assembly set forth in claim 1 wherein said backrest member includes a cross member extending there across and above said seat member, spaced vertical channels secured to said cross member, and a generally U-shaped spring wire member secured in said cross member, said spring wire member having the ends of the legs thereof extending downwardly and forwardly and secured to said mounting means, said spring wire member extending upwardly from said cross member to provide backrest cushion support.

9. The seat assembly set forth in claim 8 wherein said backrest member further includes at least one U-shaped spring wire member secured at the ends of the legs thereof to said cross member and extending upwardly therefrom in generally co-planar relation with said first named spring wire member and within the confines thereof.

10. The seat assembly set forth in claim 8 wherein said backrest member further includes a generally U-shaped border wire member secured at the ends of the legs thereof to said cross member and extending upwardly therefrom and outside said first named spring wire member.

11. The seat assembly set forth in claim 8 wherein said mounting means includes a pair of spaced first track members secured to said base structure, a pair of spaced second track members secured to the forward ends of the legs of said spring wire member and engaging said first track members, said second track members being slidable forwardly and rearwardly relative to said first track members.

12. The seat assembly set forth in claim 11 and further including a pair of spaced tunnel members mounted on said base structure and being disposed inwardly of the outer edges of said seat member, said tunnel members enclosing at least portions of said first and second track members and said ends of said legs of said U-shaped spring wire member.

13. The seat assembly set forth in claim 11 and further including means mounted on said second track members and engageable with said legs of said U-shaped spring wire member for limiting the vertical movement of said legs of said U-shaped spring wire member.

14. The seat assembly set forth in claim 13 wherein said last named means includes a U-shaped bracket secured to each of said second track members and between the ends of the legs of said U-shaped spring wire member and said cross member, said bracket surrounding said legs of said U-shaped spring wire member and limiting the upward movement thereof.

15. The seat assembly set forth in claim 14 wherein said last named means further includes a bumper member disposed within each of said bracket members and below said legs of said U-shaped spring wire member, said bumper being engageable by said legs of said U-shaped spring wire member at the lower limit of vertical movement thereof.

16. The seat assembly set forth in claim 1 and further including adjustable means mounted on said base structure for movably mounting said seat assembly on a support.

17. The seat assembly set forth in claim 1 wherein said backrest member includes a cross member extending there across, spaced first vertical channel portions secured to said cross member, second channel portions pivotally connected to said first channel portions and spring wire support members secured in said second channel portions and extending downwardly and forwardly and being secured to said mounting means, said backrest member being pivotable over said seat member about said pivotal connection.

18. The seat assembly set forth in claim 17 wherein said backrest member further includes a U-shaped spring wire member secured at the ends of the legs thereof in said first channel portions and extending upwardly thereover.

19. The seat assembly set forth in claim 18 wherein said backrest member further includes at least one U-shaped spring wire member secured at the ends of the legs thereof to said cross member and extending upwardly therefrom in generally co-planar relation with said first named spring wire member and within the confines thereof.

20. The seat assembly set forth in claim 19 wherein said backrest member further includes a generally U-shaped border wire member secured at the ends of the legs thereof to said cross member and extending upwardly therefrom and outside said first named spring wire member.

21. The seat assembly set forth in claim 20 wherein said mounting means includes a pair of spaced first track members secured to said base structure, a pair of spaced second track members secured to the forward ends of the legs of said spring wire member and engaging said first track members, said second track members being slidably forwardly and rearwardly relative to said first track members.

22. A seat assembly comprising:
a support;
a base structure movably mounted on said support for forward and rearward movement relative thereto;
a seat mounted on said base structure;
a backrest support member movably mounted for forward and rearward movement on said base structure and within said seat and extending rearwardly and upwardly over the rearward portion of said seat;
a cross member secured to said backrest support members and extending laterally over the rearward portion of said seat;
a plurality of U-shaped spring wire members secured to said cross member and extending upwardly therefrom to support a backrest cushion.

23. The seat assembly set forth in claim 22 wherein said cross member is pivotally secured to said backrest support member to permit said cross member to pivot over said seat.

References Cited

UNITED STATES PATENTS

| | | | |
|---|---|---|---|
| 2,855,026 | 10/1958 | Simons et al. | 297—355 XR |
| 2,646,839 | 7/1953 | Hillman | 297—344 XR |
| 3,039,820 | 6/1962 | Dafoe | 297—308 |
| 3,059,890 | 10/1962 | Radke, et al. | 248—399 |
| 3,059,971 | 10/1962 | Becker | 297—353 |
| 3,235,308 | 2/1966 | Conner | 297—337 |
| 3,326,602 | 6/1967 | Moore, et al. | 297—353 |
| 3,362,746 | 1/1968 | Huyge | 297—313 |

BOBBY R. GAY, Primary Examiner
GLENN O. FINCH, Assistant Examiner